(12) United States Patent
Jain et al.

(10) Patent No.: US 10,733,638 B1
(45) Date of Patent: Aug. 4, 2020

(54) ANALYZING TRACKING REQUESTS GENERATED BY CLIENT DEVICES BASED ON ATTRIBUTES DESCRIBING ITEMS

(71) Applicant: Facebook, Inc., Menlo Park, CA (US)

(72) Inventors: Dinkar Jain, Menlo Park, CA (US);
Tianshi Gao, Fremont, CA (US);
Darshan Kantak, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 53 days.

(21) Appl. No.: 16/058,959

(22) Filed: Aug. 8, 2018

(51) Int. Cl.

| | |
|---|---|
| *G06Q 30/02* | (2012.01) |
| *G06F 16/958* | (2019.01) |
| *G06F 16/955* | (2019.01) |
| *G06F 16/9535* | (2019.01) |
| *G06F 16/2457* | (2019.01) |
| *G06F 16/957* | (2019.01) |
| *G06F 16/28* | (2019.01) |
| *G06N 20/00* | (2019.01) |
| *G06Q 50/00* | (2012.01) |

(52) U.S. Cl.
CPC ... *G06Q 30/0277* (2013.01); *G06F 16/24578* (2019.01); *G06F 16/287* (2019.01); *G06F 16/955* (2019.01); *G06F 16/958* (2019.01); *G06F 16/9535* (2019.01); *G06F 16/9574* (2019.01); *G06N 20/00* (2019.01); *G06Q 50/01* (2013.01)

(58) Field of Classification Search
CPC ........... G06Q 30/0277; G06Q 30/0251; G06Q 30/0255; G06Q 30/0256; G06Q 30/0269; G06Q 50/01; G06F 16/287; G06F 16/958; G06F 16/955; G06F 16/9535; G06F 16/24578; G06F 16/9574; G06N 20/00
USPC .......... 705/14.49, 14.53, 14.55, 14.66, 14.73
See application file for complete search history.

(56) References Cited

U.S. PATENT DOCUMENTS

| 6,415,262 | B1 * | 7/2002 | Walker | G06Q 30/02 |
| | | | | 705/14.25 |
| 10,498,856 | B1 * | 12/2019 | Rogynskyy | H04L 51/34 |
| 2001/0056376 | A1 * | 12/2001 | Walker | G06Q 10/087 |
| | | | | 705/15 |
| 2002/0120925 | A1 * | 8/2002 | Logan | H04N 7/17318 |
| | | | | 725/9 |
| 2005/0131762 | A1 * | 6/2005 | Bharat | G06Q 10/00 |
| | | | | 705/14.66 |

(Continued)

*Primary Examiner* — Scott D Gartland
(74) *Attorney, Agent, or Firm* — Fenwick & West LLP

(57) ABSTRACT

An online system receives tracking requests from client devices interacting with a web page to analyze user interactions with the web page. The online system extracts parameters from tracking requests such as a uniform resource locator (URL) associated with the web page that generated the tracking request and/or data tokens describing keywords within the URL. The online system may extract parameters by crawling web pages that generate tracking requests. The online system may compare extracted parameters to a taxonomy of categories maintained by the online system to determine a category describing the item displayed on the web page. The online system determines a category describing the item via an item catalog maintained by the online system comprised of previously determined categories for various items. The online system uses the determined categories, attributes, and temporal relevance scores to direct content to users.

20 Claims, 8 Drawing Sheets

(56) References Cited

U.S. PATENT DOCUMENTS

| | | | |
|---|---|---|---|
| 2010/0030792 A1* | 2/2010 | Swinton | G06Q 30/00 705/14.54 |
| 2011/0231240 A1* | 9/2011 | Schoen | H04L 51/32 705/14.41 |
| 2013/0191394 A1* | 7/2013 | Bradley | G06Q 10/10 707/738 |
| 2018/0211209 A1* | 7/2018 | Menipaz | G06Q 10/087 |

* cited by examiner

ANALYZING TRACKING REQUESTS GENERATED BY CLIENT DEVICES BASED ON ATTRIBUTES DESCRIBING ITEMS

BACKGROUND

This disclosure relates generally to analyzing tracking requests received by an online system from client devices rendering web pages received from a website, and in particular to determining values for attributes describing items displayed on web pages generating tracking requests received by the online system.

Online systems such as social networking systems track user interactions with the online system so that they can provide features and content that is relevant to each user. The online system logs user interactions for analysis. However, online systems also prefer to monitor user interactions with external systems such as third party websites. An online system may not have direct access to logs of the external website. However, a client device can send a tracking request to the online system describing user interactions between the client device and the external website.

An external website provides instructions with the web page that are executed by the client device when the client device renders the web page. These instructions cause the tracking request to be generated for sending information to the online system. However, sometimes tracking requests received from client devices have missing parameters describing attributes of a particular item for which a user search or viewed within the external website. For example, the instructions processed by the client devices may fail to provide certain details describing an item, such as a product or a service, presented to a user on a web page of an external website. As a result, any analysis performed by the online system based on such missing attributes received from client devices is incomplete and results in the online system making incorrect inferences regarding content distributed to users by the online system. These incorrect inferences may cause the online system to take wrong actions, for example, sending irrelevant content to a user.

SUMMARY

An online system monitors information received from various sources describing user interactions to dynamically augment a user profile of a user with information describing current interests of the user. Accordingly, the online system maintains a static component of user profile for a user and optional dynamic components based on information obtained from various sources, for example, via tracking requests received by the online system from client devices interacting with an external website to analyze user interactions with the website. The external website provides instructions with web pages sent to a client device that cause the client device to send tracking instructions to the online system. A tracking request includes various parameters, for example, parameters representing data displayed in a web page provided to client devices by external websites. Using these parameters included in a given tracking request, the online system determines a category describing the web page (and/or the data displayed thereon), and adds a dynamic component based on the determined category to the user profile of the user that initiated the tracking request. In addition, the online system uses the determined category to predict values of attributes describing an item presented on the web page that generated the tracking request, as well as a timeframe at which the category may be of interest to the user, or a "temporal relevance score."

The online system stores categories, and their related attributes and temporal relevance scores, in a user profile of a user that interacted with, or otherwise showed interest in, an item presented on the web page that generated a tracking request. The data stored in the user profile may be obtained from the tracking request by extracting parameters such as a uniform resource locator (URL) associated with the web page that generated the tracking request and/or data tokens describing keywords within the URL. The online system may also extract parameters by crawling web pages that generate tracking requests. The online system may compare extracted parameters to a taxonomy of categories maintained by the online system to determine a category describing the item displayed on the web page. The online system uses the determined categories, attributes, and temporal relevance scores to direct an item of interest to a user.

BRIEF DESCRIPTION OF THE DRAWINGS

The teachings of the embodiments can be readily understood by considering the following detailed description in conjunction with the accompanying drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
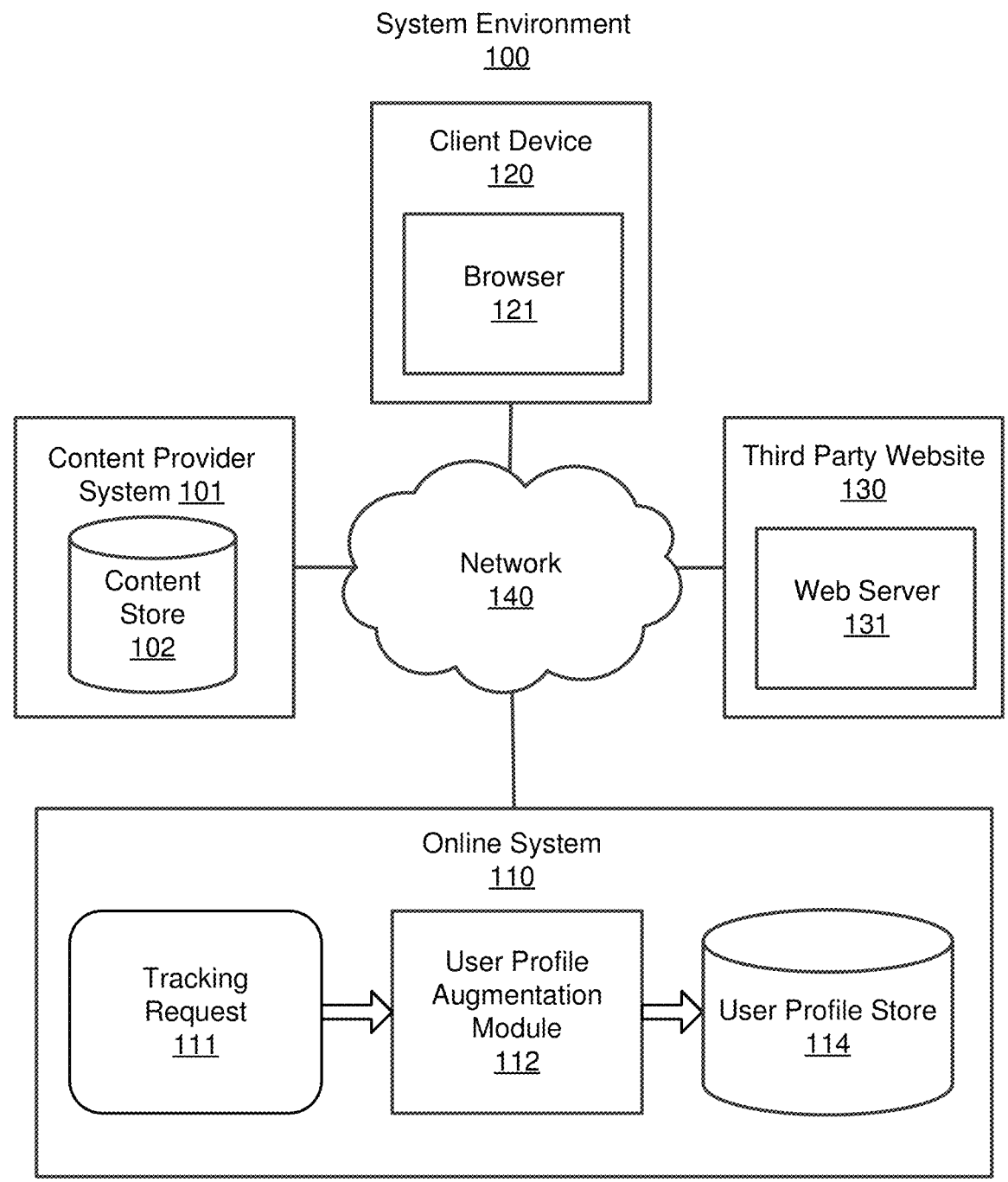
FIG. 1 is a block diagram of a system environment in which the online system operates, in accordance with an embodiment.

FIG. 1 is a block diagram of a system environment 100 in which an online system 110 operates, in accordance with an embodiment. In the embodiment illustrated in FIG. 1, the system environment 100 includes a content provider system 101, an online system 110, client devices 120, a third party website 130, and a network 140. The content provider system 101 includes a content store 102 for storing content items. The third party website 130 includes a web server 131 for delivering content items to user via client devices 120. The client devices 120 include a browser 121 that provides an interface through which users can access a third party website 130. The online system 110 includes, in part, a tracking request 111 signal, a user profile augmentation module 112, and a user profile store 114.

The content provider system 101 shown in FIG. 1 provides electronic media content items to the online system 110 for delivering to the client devices 120. Alternatively, the content provider system 101 may provide the content to a third party website 130 for providing to users of the third party website 130. The content provider system 101 may be associated with a user, an enterprise, an organization, or a group, for example, a political campaign, a university, a corporation, the government, etc. In an embodiment, a content item is a sponsored content item for which a content provider associated with the content provider system 101 provides remuneration to the online system (or a content publisher) for delivery of the content items to an online audience via the client devices 120. The term "content item" refers to "electronic media content item" wherever it appears herein. Content items may be images, text paragraphs, video clips, audio clips, hyperlinks, online forms, etc. Examples of sponsored content items include online advertisements.

The content store 102 shown in FIG. 1 is used by the content provider system 101 for storing content items. The content store 102 may be organized as a database, table, file, etc., stored on one or more of removable or non-removable memory cards, tape cassettes, zip cassettes, and computer hard drives. The content store 102 may include multiple data fields, each describing one or more attributes of the content items. The content store 102 may include, for a single content item—a content provider identifier (e.g., whether the content item is provided by the government), a list of policies or one or more weights regarding delivering of the content item to the client devices 120 and the third party website 130, one or more threshold rates of client interactions, a list of desired client interactions, such as clicking on a link in a content item, closing a content item using a close button on a browser of a client device, sharing a content item from a first client device to a second client device, performing a transaction associated with a content item, and so on. The content store 102 may also store for all content items—the number of content items to be delivered in a given time interval, a length of a time interval during which the content items are expected to be delivered, an estimate of a total number of deliveries of content items during the time interval, and so on. A delivery of a content item refers to an instance of a particular content item being delivered to a user. For example, if the same content item is delivered to multiple users or multiple times to the same user, each instance is referred to as a delivery.

The client devices 120 shown in FIG. 1 can be used by online system 110 users for interacting with the online system 110 and the third party website 130. Each client device 120 is a computing device capable of receiving client input as well as transmitting and/or receiving data via the network 140. The client device 120 may be a conventional computer system, such as a desktop or laptop computer. Alternatively, the client device 120 may be a device having computer functionality, such as a personal digital assistant (PDA), a mobile telephone, a smartphone or another suitable device. The client device 120 may execute an application allowing a user of the online system 110 to interact with the online system 110 and/or the third party website 130. In one example, the client device 120 executes a browser application 121 to enable interaction between the client device 120 and the online system 110 via the network 140. In one example, the client device 120 interacts with the third party website 130 through an application programming interface (API) running on a native operating system of the client device 120, such as IOS® or ANDROID™. A user may download content items from the online system 110 to the client device 120 using the browser 121. In addition, a user may interact with the content items by clicking on a link in a content item, filling in client information into an online form, closing the content item using a "close window" button on the browser 121 or on the client device 120, etc.

The third party website 130 can be any website that provides content to users. For example, the third party website 130 may be a digital publisher of newspapers, e-books, digital magazines, digital libraries, digital catalogues, etc. The third party website 130 may distribute content including web pages, videos, and text, for example, books, magazines, and newspapers to users through tablet reading devices, distribution via the Internet (in the form of the browser 121 accessible by the client devices 120), other interactive media, etc. The third party website 130 is a collection of web pages, including multimedia content, typically identified with a common domain name, and published on at least one web server 131. The third party website 130 may be accessible via a public Internet Protocol (IP) network, such as the Internet, or a private local area network (LAN), by referencing a uniform resource locator (URL) that identifies the site. The third party website 130 can have many functions and can be used in various fashions—a personal website, a commercial website for a company, a government website, a non-profit organization website, website for entertainment, social networking system, a website providing news or educational content, private website such as a company's website for its employees typically a part of an intranet, etc.

In one embodiment, the third party website 130 can embed tracking instructions for generating tracking requests within one or more web pages of the third party website 130 in order to track user interactions. In an embodiment, the tracking instructions are associated with one or more tracking pixels. A tracking pixel is a portion of a web page, for example, a segment of HTML code that produces a transparent 1×1 image, an iframe, or other suitable object that may be embedded in a web page sent to a client device by the third party website 130. A tracking pixel is activated, or triggered, when a web page is loaded (e.g., rendered) into a user's browser 121 on a client device 120 for viewing.

When a tracking pixel is rendered, the HTML code of the tracking pixel sends a tracking request 111, to the online system 110. The tracking request 111 may include information, or "parameters," describing an item displayed on the web page being rendered such as an item category, item price, and/or an item rating. For example, the third party website may provide items, such as products/services, that a user can view and/or purchase via a client device 120 and a tracking request 111 may provide details of the item to the online system 110. These details may include an identifier for the item, a price of the item, attributes describing the item such as color, size, and any other description of the item. In one embodiment, the tracking request 111 may include information describing the web page being rendered, for example, a label describing the web page, metadata describing values, data, or widgets presented to the user by the web page, and so on. Tracking requests 111 convey to the online system 110 information describing user interaction of a user with a third party website 130 or any third party website external to the online system 110. For example, a tracking pixel may trigger when the client device 120 renders a web page of a search engine subsequent to a user requesting a search for a particular item. In one embodiment, the client device 120 sends a tracking request to the online system 110 identifying the user, the item for which the user was searching, and any metadata describing the item within the rendered web page. In another embodiment, a tracking request 111 includes only a user identifier and the URL of the rendered web page.

The user profile augmentation module 112 receives tracking requests 111 from client devices 120, determines a category described by the parameters, and predicts values for attributes associated with the determined category. In some embodiments, the online system 110 assigns a temporal relevance score for each determined category that predicts a timeframe or a time window during which an item, or items, described by the parameters in the tracking request 111 will most likely be of interest to a given user. For example, a client device 120 may send a tracking request 111 responsive to rendering a search engine web page showing results of a search for an item generated by a user. Accordingly, the user profile augmentation module 112 uses parameters provided in the tracking request 111 to determine a category describing the item (e.g., men's apparel). Once the category is determined, the user profile augmentation module 112 identifies attributes associated with the determined category (e.g., size, color, price), and predicts values for each identified attribute describing the category (e.g., size 12, red, $15.00, respectively). In one embodiment, the user profile augmentation module 112 identifies attributes (and their associated values) describing a given category using one or more machine learning based models. In another embodiment, the user profile augmentation module 112 uses a taxonomy store comprised of a variety of categories and associated attributes to identify attributes describing a determined category. In some embodiments, the user profile augmentation module 112 uses information about the user to generate a temporal relevance score describing a period of time in which the user is most likely to find the category, or item described by the category, of interest. The user profile augmentation module 112 is discussed in further detail herein.

The content provider system 101, third party website 130, client devices 120, and the online system 110 are configured to communicate via the network 140 shown in FIG. 1, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 110 as disclosed provides benefits and advantages that include increased engagement of users with content items and accurate reporting of data describing user interactions with third party websites. Other advantages of the online system 110 include efficient delivery of content to users by eliminating delivery of content items in cases where users are unlikely to interact with the content items, faster processing of the online system 110 since fewer content items are transmitted, less power consumption, lower latency in content transmission, less data transmitted over the network 140, etc. Conventional systems that send content items to users that are not interested in the content items waste communication and computational resources by processing and transmitting content items that are unlikely to be viewed by users. Therefore, embodiments of the invention increase the communication and computation efficiency of online systems by effectively directing content items to users that have a high likelihood of accessing the content items and interacting with the content items.

System Architecture

Figure 2:
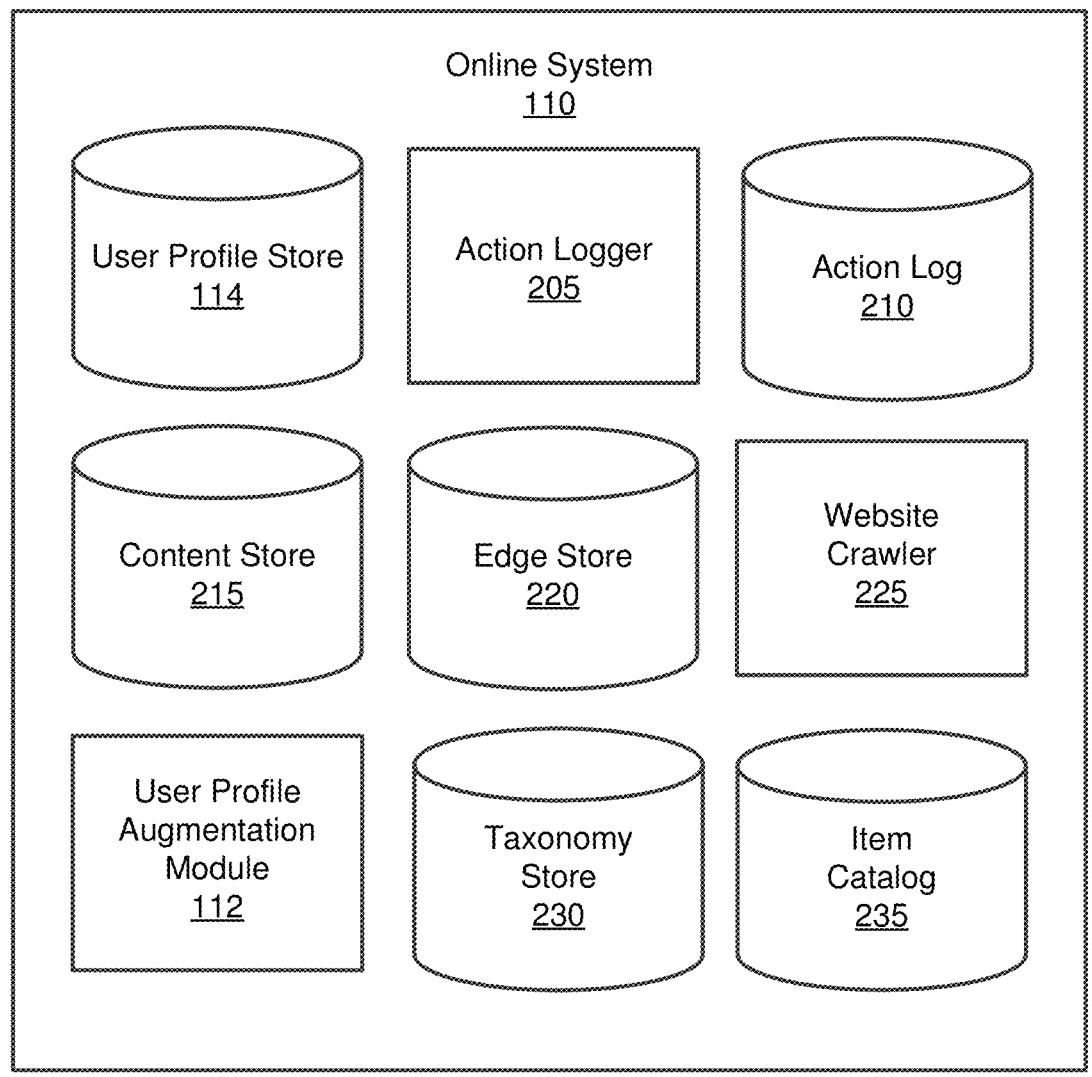
FIG. 2 is a block diagram of a system architecture of the online system, in accordance with an embodiment.

FIG. 2 is a block diagram of an online system 110, according to one embodiment. In the embodiment illustrated in FIG. 2, the online system 110 includes a user profile store 114, an action logger 205, an action log 210, a content store 215, an edge store 220, a website crawler 225, a user profile augmentation module 112, a topic taxonomy 230, and an item catalog 235. In other embodiments, the online system 110 may include additional, fewer, or different components for various applications. Conventional components such as network interfaces, security function, load balancers, failover servers, management and network operations consoles, and the like are not shown so as to not obscure the details of the system architecture.

In particular embodiments, content within the online system 110 may be associated with one or more privacy settings. Although the examples discussed herein are in the context of an online social network, the privacy settings may be applied to any other suitable computing system. Privacy settings, also referred to as "access settings," for a content item may be stored in any suitable manner, for example in association with the content item in an index on an authorization server, in another suitable manner, or in any combination of suitable manners. A privacy setting for an object may specify how the content item may be accessed, stored, or otherwise used (i.e., viewed, shared, modified, copied, executed, surfaced, or identified) within the online system 110. In one embodiment, a user of the online system 110 may specify privacy settings for a user account that identify a set of users that may access work-experience information on the user account, thus excluding other users from accessing that information. Similarly, privacy settings may specify a "blocked list" of users or other entities that may not access certain information associated with the object, including content providers. For example, a user may specify a set of users who may not access images associated with the user, thus excluding them from accessing the images while simultaneously allowing certain users not within the specified set of users to access the images.

Privacy settings associated with a content item may specify any suitable granularity of permitted access or denial of access. For example, access or denial of access may be specified for particular users of the online system 110, users of the online system 110 within a specified degree of separation, users within a particular group or network, or users associated with a third party content provider (e.g., content provider system 101). The privacy settings as described herein may describe any suitable granularity of permitted access or denial of access.

In some embodiments, different content items of the same type associated with a certain user may have different privacy settings. Different types of objects associated with a user may have different types of privacy settings. For example, a first user may specify that a first user's posted content is available to be viewed by the public, but any images shared by the first user are available only to the first user's friends in the online social network. As another example, a first user may specify a group of users that may view videos posted from the first users while keeping videos from being available to certain users connected to the first user. In some embodiments, different privacy settings may be established by the online system 110 for different users groups or user demographics.

In some embodiments, a user may specify whether particular types of content items or information associated with the first user may be accessed, stored, or used by the online system 110. For example, the first user may specify that images sent by the first user through the online system 110 may not be stored by the online system 110. As another example, a first user may specify that messages sent from the first user to a particular second user may not be stored by the online system 110. As a further example, a first user may specify that all content items sent via a particular application may be saved by the online system 110.

In additional embodiments, privacy settings may allow a first user to specify whether particular content items or information associated with the first user may be accessed from particular providers. The privacy settings may allow the first user to opt in or opt out of having objects or information accessed from a particular device (e.g., the phone book on a user's client device 120), from a particular application (e.g., a messaging application), or from a particular system (e.g., an email server). The online system 110 may provide default privacy settings with respect to each device, system, or application, and/or the first user may be prompted to specify a particular privacy setting for each context. For example, the first user may utilize a location-services feature of the online system 110 to provide recommendations for restaurants or other places in proximity to the user. The first user's default privacy settings may specify that the online system 110 may use location information provided from a client device of the first user to provide the location-based services, but that the online system 110 may not store the location information of the first user or provide it to any content provider. The first user may then update the privacy settings to allow location information to be used by a third-party image-sharing application in order to geo-tag photos.

Each user of the online system 110 is associated with a user profile, which is stored in the user profile store 114. Each user profile includes a static component and one or more dynamic components. The static component includes declarative information about the user that was explicitly shared by the user and may also include profile information inferred by the online system 110. The dynamic component includes information collected by the online system 110 and assembled by the user profile augmentation module 112 and/or the website crawler 225 and has temporal relevance to the user since a dynamic component may store information that is relevant during a particular time window and may not be relevant outside the time window.

In one embodiment, a static component of a user profile of an online system user includes multiple data fields, each describing one or more attributes of the user. Examples of information stored in a static component of a user profile include biographic, demographic, and other types of descriptive information, such as name, work experience, educational history, gender, hobbies or preferences, location and the like. A static component of a user profile may also store other information provided by the user, for example, images such as profile picture of the user. In certain embodiments, an image of a user may be tagged with information identifying the online system 110 user displayed in an image. A static component of a user profile in the user profile store 114 may also maintain references to actions by the corresponding user performed on content items in the action log 210.

In one embodiment, a dynamic component of a user profile of an online system user includes multiple data fields describing one or more categories of interest to the user. The multiple data fields each include attributes describing a category, in addition to a temporal relevance score describing a timeframe in which items of the category are predicted to be of interest to a user. The dynamic component of a user profile is dynamic since the user profile augmentation module 112 dynamically creates new data fields, or updates values stored in existing data fields, the values describing attributes associated with categories based on receiving tracking requests 111 from third party websites 130. For example, in response to receiving a tracking request 111, the user profile augmentation module 112 extracts parameters from the tracking request 111. In one embodiment, the user profile augmentation module 112 determines a category from a taxonomy of categories. The taxonomy store 230 stores the taxonomy of item categories. Once a category has been determined, the user profile augmentation module 112 predicts values for attributes associated with the category.

In one embodiment, the user profile augmentation module 112 uses one or more machine learning based models to predict the attributes associated with the category. In this embodiment, machine learning based models are configured to receive one or more parameters extracted from a given tracking request that are used to predict values for attributes for the user profile dynamic component. These machine learning based models may be trained using data collected by the online system 110 from previous tracking requests. For example, if a tracking request generated by a shopping web page includes parameters describing a "shoe" category, the machine learning based models can receive the parameters and predict attributes associated with the category, such as size, brand, color, and/or price, for example. In another embodiment, the user profile augmentation module 112 uses the taxonomy store 230 to identify attributes associated with a determined category. In this embodiment, attributes describing a given category may be stored in the taxonomy store 230 such that each category includes attributes describing the category. The attributes describing a determined category are stored in the user profile as part of the dynamic components, thereby reflecting an action, or intent, of a user when the tracking request 111 was generated.

In some embodiments, the dynamic component of a user profile includes a temporal relevance score indicating a predicted timeframe in which a user might be most likely to find a category, or item described by a category, of interest. The temporal relevance scores associated with each category may increase or decrease according to the temporal relevance associated with a given category. For example, an increasing temporal relevance score may indicate that a user is likely to perform an action associated with the category, or item described by the category, such as search for different items within the determined category, make a purchase of the item described by the category, suggest the category to another user of the online system 110, or any other actions related to the category. Conversely, a decreasing temporal relevance score may indicate that the category is less relevant to a user as compared to other categories stored in the dynamic component of the user profile, and/or that the user may no longer be interested in the category. For example, if a user has recently performed an action associated with the category, the user will most likely not be as interested in the category as compared to prior to the action being performed.

In one embodiment, temporal relevance scores are represented by a numeric value associated with each category. In another embodiment, a temporal relevance score may be represented by a weighted average indicating a frequency in which a user searches, or otherwise interacts with, a given category determined by the user profile augmentation module 112. In this embodiment, the temporal relevance score associated with a given category may increase in response to a high frequency of interactions with the category, and decrease in response to a diminishing frequency of interactions. In another embodiment, a temporal relevance score may be based on a period of time since a user's previous interaction with a given category. For example, categories with which a user has not interacted for an extended period of time may be assigned a lower temporal relevance score than categories that received a more recent interaction. In another embodiment, the temporal relevance score may be based on attributes associated with a given category. For example, if a user is loyal to a preferred brand of clothing apparel, attributes describing items having that preferred brand may receive a higher temporal relevance score than items of different brands. In one embodiment, each category remains in the dynamic component of a user profile regardless of its temporal relevance score. If the temporal relevance score of a category is within a threshold value, as determined by the online system 110, the online system 110 directs a content item associated with the category, or the item described by the category, to the client device 120 of the user.

While user profiles in the user profile store 114 are frequently associated with individuals, allowing individuals to interact with each other via the online system 110, user profiles may also be stored for entities such as businesses or organizations. This allows an entity to establish a presence on the online system 110 for connecting and exchanging content with other online system 110 users. The entity may post information about itself, about its products or provide other information to users of the online system 110 using a brand page associated with the entity's user profile. Other users of the online system 110 may connect to the brand page to receive information posted to the brand page or to receive information from the brand page. A user profile associated with the brand page may include information about the entity itself, providing users with background or informational data about the entity.

The action logger 205 receives communications about user actions internal to and/or external to the online system 110, populating the action log 210 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 210.

The action log 210 may be used by the online system 110 to track user actions on the online system 110, as well as actions on third party websites 130 that communicate information to the online system 110. Users may interact with various objects on the online system 110, and information describing these interactions is stored in the action log 210. Examples of interactions with objects include: viewing videos, commenting on posts, sharing links, checking-in to physical locations via a mobile device, accessing content items, and any other suitable interactions. Additional examples of interactions with objects on the online system 110 that are included in the action log 210 include: viewing videos posted by a user's connections in the online system 110, commenting on a photo album, communicating with a user, establishing a connection with an object, joining an event, joining a group, creating an event, authorizing an application, using an application, expressing a preference for an object ("liking" the object), and engaging in a transaction. Additionally, the action log 210 may record a user's interactions with sponsored content on the online system 110 as well as with other applications operating on the online system 110. In some embodiments, data from the action log 210 is used to infer interests or preferences of a user, augmenting the interests included in the user's user profile and allowing a more complete understanding of user preferences. For example, parameters associated with tracking requests 111 received by the user profile augmentation module 112 are stored in the action logger 205 to be further processed in order to determine categories, predict values of attributes describing the categories, and assign a temporal relevance score. In one embodiment, parameters extracted from tracking requests 111 stored in the action log 210 include a user identification and a URL associated with the web page that generated the tracking request 111. In other embodiments, the action log 210 may include greater, fewer, or different parameters associated with a tracking request 111.

In one embodiment, the edge store 220 stores information describing connections between users and other objects on the online system 110 as edges. Some edges may be defined by users, allowing users to specify their relationships with other users. For example, users may generate edges with other users that parallel the users' real-life relationships, such as friends, co-workers, partners, and so forth. In one embodiment, the user profile store 114 stores data describing the connections between different users of the online system 110, such as the number of friends shared between the users out of the total number of friends, the fraction of time since joining or becoming a member of the social networking system that overlaps between the two users (e.g., whether the users joined the online system at the same time or have an overlap for a certain period of time), or a combination of these signals. The record of users and their connections in the online system 110 may be called a "social graph."

Other edges are generated when users interact with objects in the online system 110, such as expressing interest in a page on the online system 110, sharing a link with other users of the online system 110, viewing videos posted by other users of the online system 110, and commenting on posts or videos provided by other users of the online system 110. The connections between users and other objects, or edges, can be unidirectional (e.g., a user following another user) or bidirectional (e.g., a user is a friend with another user).

In one embodiment, an edge may include various features each representing characteristics of interactions between users, interactions between users and objects, or interactions between objects. For example, features included in an edge can describe a rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 110, or information describing demographic information about a user. Each feature may be associated with a source object or user, a target object or user, and a feature value. A feature may be specified as an expression based on values describing the source object or user, the target object or user, or interactions between the source object or user and target object or user. Hence, an edge may be represented as one or more feature expressions.

The edge store 220 also stores information about edges, such as affinity scores for objects, interests, and other users. In one embodiment, affinity scores, or "affinities," are computed by the online system 110 over time to approximate a user's interest in an object or another user in the online system 110 based on the actions performed by the user. A user's affinity may be computed by the online system 110 over time to approximate a user's affinity for an object, interest, and other users in the online system 110 based on the actions performed by the user. Multiple interactions between a user and a specific object may be stored as a single edge in the edge store 220, in one embodiment. Alternatively, each interaction between a user and a specific object is stored as a separate edge.

The content store 215 stores objects that represent various types of content. Examples of content represented by an object include a video, page post, status update, photograph, link, shared content item, gaming application achievement, check-in event at a local business, brand page, or any other type of content. Online system 110 users may create objects stored by the content store 215, such as status updates, photos tagged by users to be associated with other objects in the online system 110, events, groups, or applications. In some embodiments, objects are received from third party websites 130 and placed in the content store 215. These objects may represent sponsored content campaigns provided to the third party website 130 by a content provider system 101.

The website crawler 225 crawls third party websites 130 to retrieve information describing items presented on the third party websites 130. In one embodiment, the website crawler 225 retrieves parameters from third party websites 130 responsive to the online system 110 receiving tracking requests 111 from the third party websites 130. In these embodiments, the website crawler 225 crawls the third party website 130 to identify additional parameters associated with an item displayed on a web page that caused a tracking request 111. For example, if the online system 110 receives a URL associated a shopping web page displaying a shoe for sale, the user profile augmentation module 112 can evoke the website crawler 225 to parse metadata contained within the HTML comprising the shopping web page that generated the tracking request 111. In response to the website crawler 225 identifying keywords in the metadata describing the shoe (e.g., "footwear," "sneaker," "high top," and the like), the user profile augmentation module 112 can cross-reference the identified keywords against keywords contained in the taxonomy store 230 in order to determine a category. In one embodiment, the keywords identified by the website crawler 225 may serve as input to one or more machine learning models in order to determine a category describing the keywords. Keywords identified by the website crawler 225 are stored as attributes describing a category in the dynamic component of a user profile.

In one embodiment, the website crawler 225 uses test accounts to connect with the third party website 130 and sends requests to the third party website 130 to retrieve item information. For example, the website crawler 225 may generate an HTTP request for performing a search for a particular item or browse the particular item. The website crawler 225 receives a web page from the third party website 130 and extracts keywords describing the item from the web page. In one embodiment, the website crawler 225 provides the keywords to the user profile augmentation module 112 that cross-references the keywords against keywords stored in the taxonomy store 230 to determine a category describing the item. In another embodiment, the website crawler 225 stores the keywords as attributes in the dynamic component of a user profile. In an embodiment, the website crawler 225 sends HTTP requests representing keyword searches to retrieve items matching the search request. The website crawler 225 sends follow-up HTTP requests to retrieve detailed information for each item returned by the previous request. Accordingly, the website crawler 225 periodically accesses third party websites 130 to contribute additional data to the taxonomy store 230 and/or item catalog 235.

The user profile augmentation module 112 receives tracking requests 111 as input, determines a category describing an item presented on a web page that generated the tracking request 111, and predicts values for attributes describing the determined category. In addition, the user profile augmentation module 112 determines a temporal relevance score that describes a period of time in which a user (e.g., the user that searched for an item) is most likely to find an item of interest. In one embodiment, the user profile augmentation module 112 uses parameters associated with a tracking request 111 to predict a category, such as those from a URL of a search engine web page, and/or data tokens describing keywords within the URL, for example. In another embodiment, the user profile augmentation module 112 evokes the website crawler 225 to parse metadata (e.g., HTML) extracted from the web page and identify parameters such as keywords describing the category of the item. In another embodiment, the user profile augmentation module 112 uses data displayed on the web page indicating a search history in which a user searched for an item, such as breadcrumb data or a directory of searched categories, for example. In yet another embodiment, the online system 110 determines a category by comparing an item identifier describing an item to an internal item catalog maintain by the online system 110. In each embodiment, the online system 110 may utilize the taxonomy store 230 to cross-reference identified parameters in order to determine a category describing the item. In addition, the online system 110 may employ one or more machine learning models to predict values of at least some of the attributes associated with the category. The online system 110 stores a determined category, along with its associated attributes and temporal relevance score, as a dynamic component of the user profile belonging to the user of the online system 110 that performed the search for the item.

The taxonomy store 230 is a database containing a standardized set of descriptions of categories typically associated with items presented on third party websites 130. These categories of items may encompass those associated with a physical item displayed on a web page (e.g., an item available for purchase), a service offered via the web page (e.g., a house cleaning service), and/or a topic describing an event presented on a web page (e.g., news, entertainment, sports, and the like). The user profile augmentation module 112 uses the descriptions of categories contained in the taxonomy store 230 to cross-reference keywords extracted from parameters, such as data tokens included in a URL of a web page that generated a tracking request 111, for example. Upon identifying a match between one or more keywords extracted from the parameters of a tracking request 111 and one or more category entries in the taxonomy store 230, the user profile augmentation module 112 assigns a category to the items presented on third party websites 130. For example, if the user profile augmentation module 112 extracts the keywords "shirt" and "jeans" from a web page, the user profile augmentation module 112 can search the taxonomy store 230 for the extracted key words, identify a match, and determine that the keywords are affiliated with a category describing "clothing and apparel." In one embodiment, the taxonomy store 230 includes a list of one or more attributes associated with each category stored in the taxonomy store 230. For example, the category describing "clothing and apparel" may additionally include data describing the shirt and jeans presented on the web page, such as size, color, brand, and the like.

In one embodiment, the taxonomy store 230 is a relational database management system (RDBMS) that presents categories in a tabular form (i.e., as a collection of tables consisting of rows and columns). In other embodiments, the taxonomy store 230 may be a non-relational database such as a key-value store, document store, wide-column store, or any other type of database used to store hierarchical, tree-like structures of data.

The item catalog 235 includes a collection of item identifiers, or "item IDs," that is built and maintained by the online system 110. The online system 110 builds the item catalog 235 by processing data received from a large number of tracking requests 111 generated over time. The items are associated with one or more categories of the taxonomy stored in the taxonomy store 230. In one embodiment, each entry in the item catalog 235 includes an item descriptor (e.g., Commercial Electric Stapler) and its associated item ID, such as a stock keeping unit (SKU) alphanumeric code, for example. In another embodiment, an entry in the item catalog 235 may also include a category describing the item. The user profile augmentation module 112 may use the item catalog 235 to identify an item presented on a third party website 130 that generated a tracking request 111. For example, if a user searches for a toaster oven on a merchant website, the web page that generates a tracking request 111 may annotate the parameters included in the tracking request 111 with an item ID, or SKU, for the toaster oven. The user profile augmentation module 112 can use this item ID to identify the item that was displayed on the merchant website, and predict attributes (e.g., price, brand, model, and the like) to be included as a dynamic component of the user profile belonging to the user that generated the tracking request 111.

Process for Receiving Tracking Requests

Figure 3:
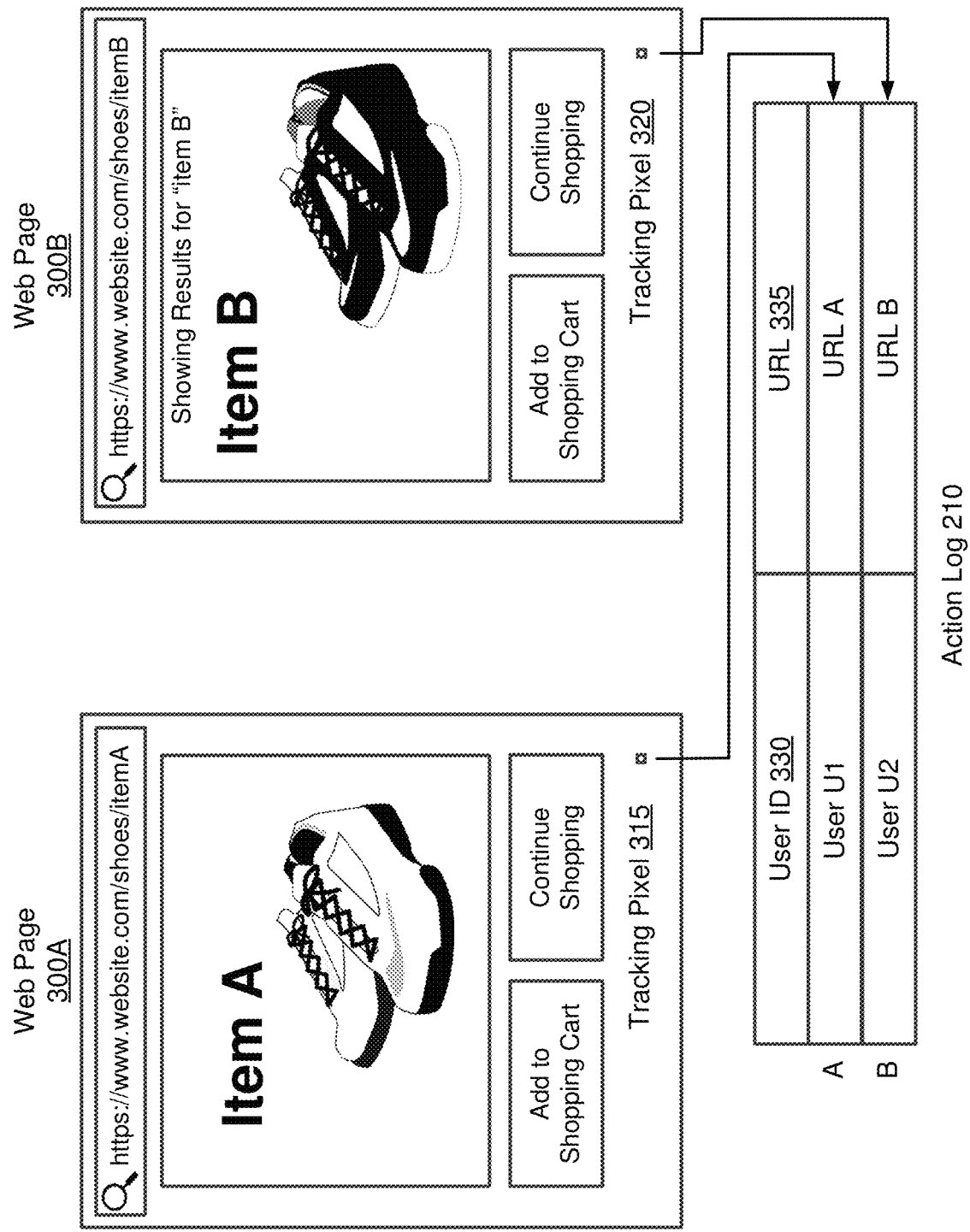
FIG. 3 illustrates an example use case of receiving and storing tracking request parameters, in accordance with an embodiment.

FIG. 3 illustrates an example use case of receiving and storing tracking requests 111, according to one embodiment. In the embodiment illustrated in FIG. 3, web page 300A displays a pair of white shoes (e.g., Item A). This web page 300A contains a tracking pixel 315 that sends a tracking request 111 to the online system 110 as the web page 300A is loaded. The user profile augmentation module 112 receives the tracking request 111 and stores the parameters contained within the tracking request 111 in the action log 210. This is shown in FIG. 3 where the online system 110 stores, both, a user identification (e.g., user U1) and the URL from which the tracking request 111 was generated (e.g., URL A) in row A of the action log 210. In addition, web page 300B displays a pair of black shoes (e.g., Item B) and contains a tracking pixel 320 that sends a tracking request 111 to the user profile augmentation module 112 as the web page 300B is rendered. Similar to row A, the user profile augmentation module 112 stores parameters associated with the tracking request 111 generated by tracking pixel 320 in the action log 210. This is shown in FIG. 3 where the user profile augmentation module 112 stores the user identification (e.g., user U2) and the URL from which the tracking request 111 was generated (e.g., URL B) in row B of the action log 210. In one embodiment, each tracking request 111 received by the user profile augmentation module 112 contains at least a user identification and URL information describing the third party website 130 from which the tracking request originated. In other embodiments, greater or fewer parameters may be received by the online system 110 in response to receiving a tracking request 111.

Process for Extracting Parameters from Tracking Requests

Figure 4:
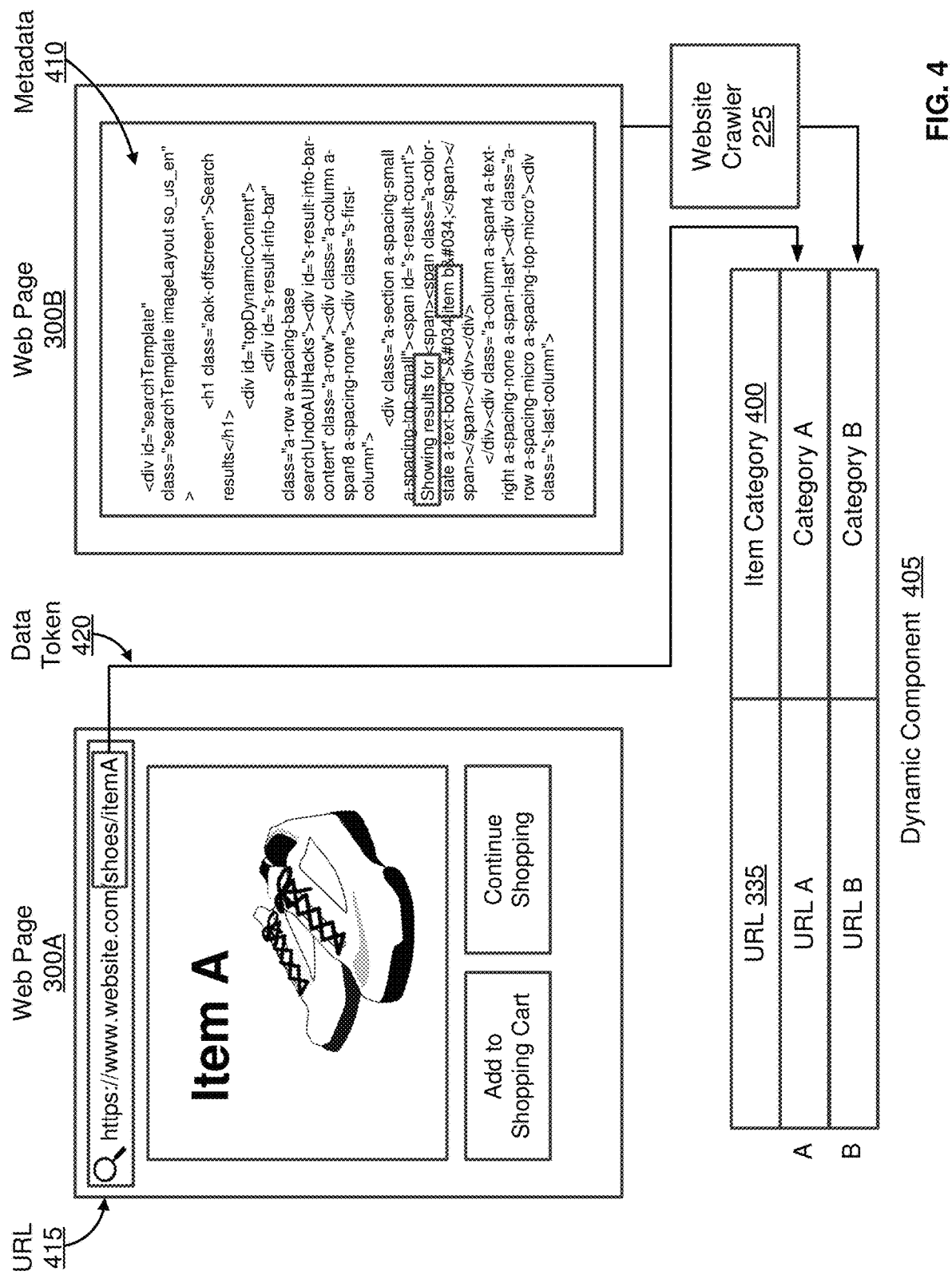
FIG. 4 illustrates an example use case of collecting and storing attributes, in accordance with an embodiment.

FIG. 4 illustrates the process by which the user profile augmentation module 112 determines item categories described by parameters from tracking requests 111, according to one embodiment. In the embodiment illustrated in FIG. 4, the user profile augmentation module 112 identifies the URL 335 from which a tracking request was received (e.g., URL A), and parses the URL 335 for data tokens that serve as keywords describing an item category (e.g., Category A). This is shown in FIG. 4 where the user profile augmentation module 112 parses the URL 415 for web page 300A (https://www.website.com/shoes/itemA) to identify the keywords "shoes" and "itemA." Using these data tokens 420 describing "Item A," the user profile augmentation module 112 determines a category describing the item (e.g., shoes). In one embodiment, the user profile augmentation module 112 cross-references the data tokens with keywords included in the taxonomy store 230, maintained by the online system 110, to determine the category that best describes the item. In other embodiments, the user profile augmentation module 112 may use one or more machine learned models to process the data tokens contained within the URL and generate an item category.

In one embodiment, the website crawler 225 accesses the third party website 130 that sent the web pages that generated the tracking requests to directly access web pages describing the items (e.g., web page 300B). The website crawler 225 parses the HTML comprising the web page to retrieve keywords describing the item. In the example illustrated in FIG. 4, the website crawler 225 obtains web page 300B and identifies the keywords "Showing results for" and "item b" in the metadata 410 of web page 300B. Because the website crawler 225 has identified that "item b" was displayed on web page 300B (as shown in FIG. 3), the user profile augmentation module 112 determines an item category that describes the item (e.g., shoes). In one embodiment, the user profile augmentation module 112 cross-references the keywords located in the metadata 405 with keywords included in the taxonomy store 230. In other embodiments, the user profile augmentation module 112 may further employ the use of machine learning models to identify one or more item categories based on the identified keywords from the metadata 405.

Process for Building Dynamic Component of User Profile

Figure 5A:
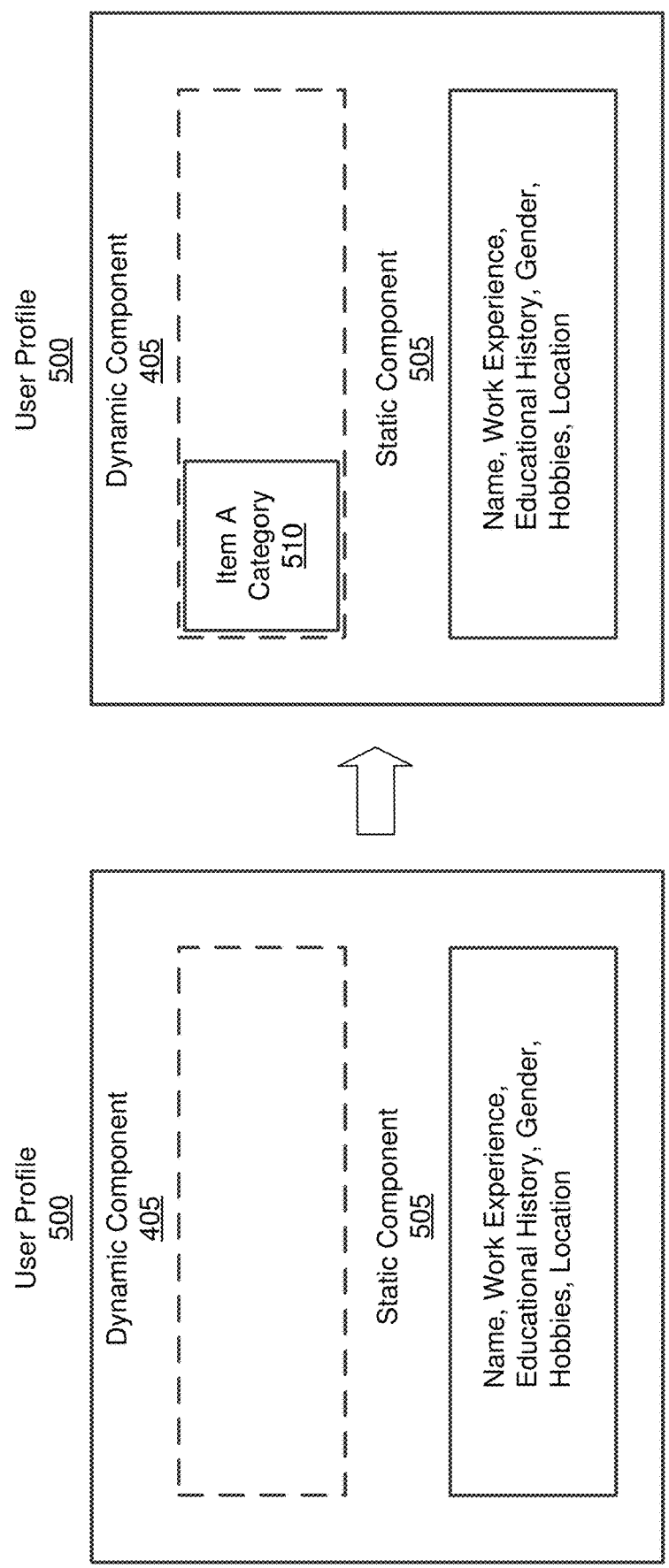
FIGS. 5A-C illustrate an example use case of storing attributes in a dynamic component of a user profile, in accordance with an embodiment.
Figure 5B:
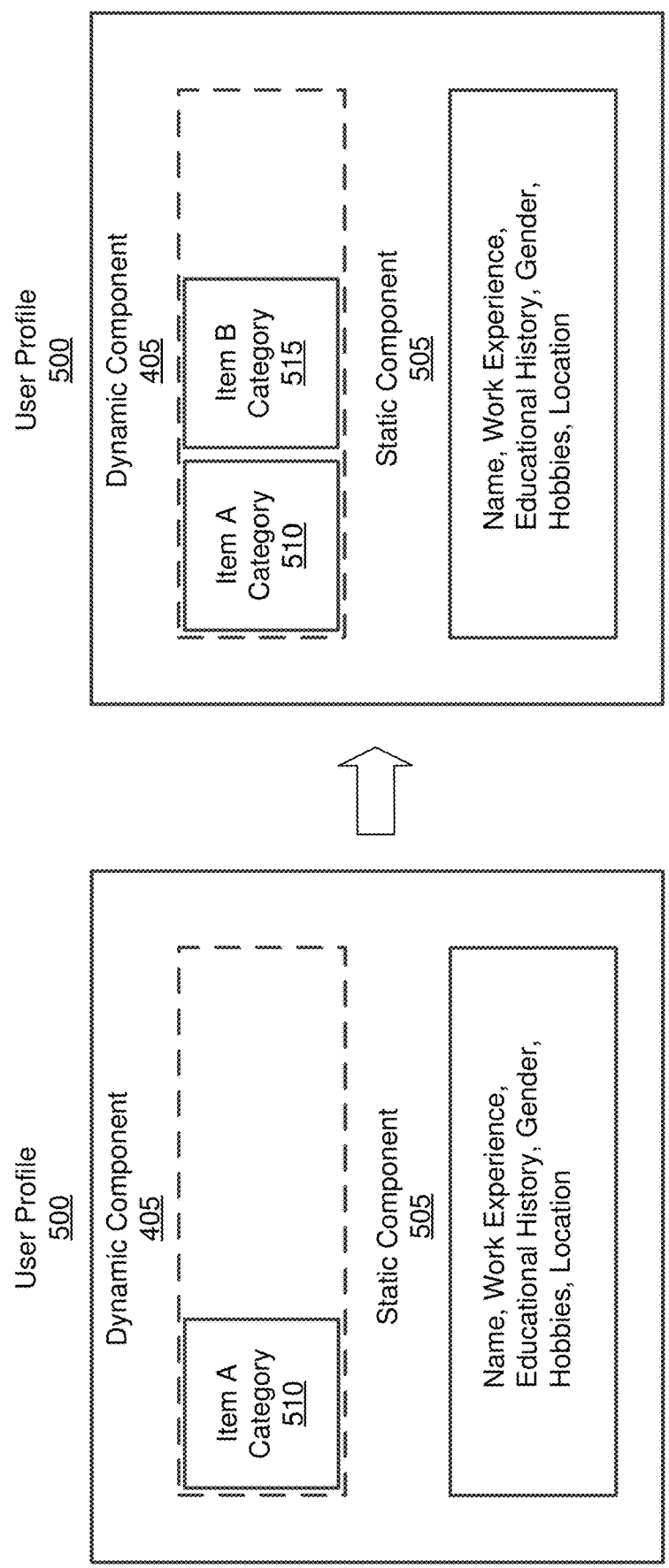
Figure 5C:
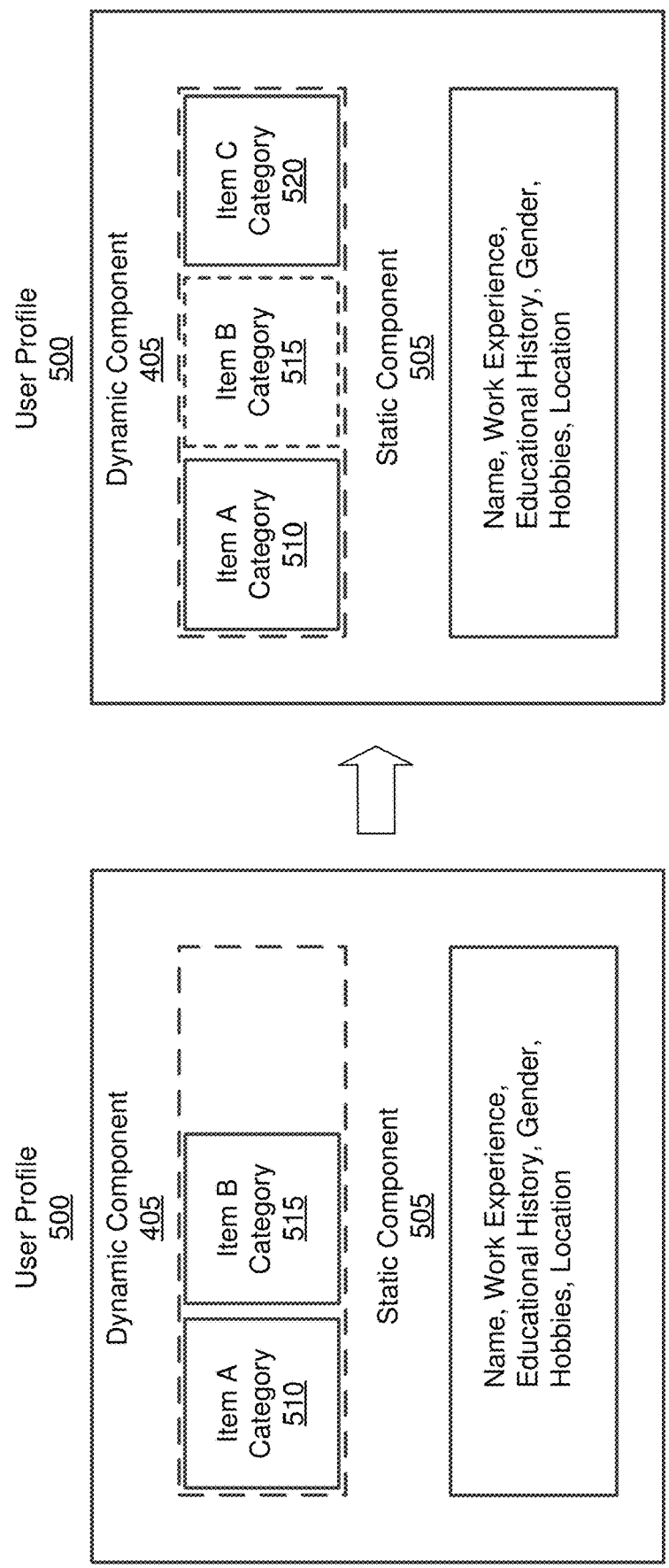

FIGS. 5A-C illustrate a process for building a dynamic component 405 of a user profile 500, according to one embodiment. In the embodiment illustrated in FIG. 5A, the user profile 500 consists of a dynamic component 405 and a static component 505. The static component 505 includes declarative information about a user that was explicitly shared by the user and may also include profile information inferred by the online system 110. In the example shown in FIG. 5A, the static component 505 includes the user's name, work experience, educational history, gender, hobbies, and location. The dynamic component 405 of the user profile 500 includes multiple data fields describing one or more categories of interest to the user.

Each data field of the dynamic component 405 of the user profile 500 includes attributes describing a category, and a temporal relevance score describing a timeframe in which the category is predicted to be most likely of interest to the user. In the example shown in FIG. 5A, the dynamic component 405 is initially empty. However, as tracking pixels (such as those shown in FIG. 3) generate tracking requests 111 in response to the user loading a given web page, the user profile augmentation module 112 determines an item category 400 using parameters provided with the tracking request 111 or identified via web crawling using the website crawler 225. This process is shown in FIG. 5A where item A category 510 is stored in the dynamic component 405 of the user profile 500. In this example, item A category 510 may describe a "shoe" category that includes attributes such as size, color, brand name, price, and the like.

In addition, item A category 510 may also include a temporal relevance score indicating a time window in which the user is likely to perform an action associated with item A category 510, such as search for different items within item A category 510, make a purchase of item A, suggest item A category 510 to another user of the online system 110, etc. In this example, the temporal relevance score may be represented by a numeric value, such as a value from 1 to 10 indicating a weak likelihood of performing an action to a strong likelihood of performing an action, respectively. In FIG. 5A, the temporal relevance for item A category 510 is represented using a solid border encompassing item A category 510, indicating that the temporal relevance for item A is within a given threshold value. In some embodiments, the taxonomy store 230 stores a default size of time window for each category. Alternatively, the user profile augmentation module 112 determines the size of the time window based on the temporal relevance score determined for the user for the category associated with the dynamic component of the user profile. The user profile augmentation module 112 determines an expiry date for the dynamic component based on the size of the time window and the time at which the dynamic components was initialized or populated.

In an embodiment, the user profile augmentation module 112 deletes a dynamic component after the expiry date of the dynamic component. Alternatively, the user profile augmentation module 112 marks the dynamic component as being inactive after the expiry date. The taxonomy store 230 stores information indicating whether the category of items is associated with a periodicity. A category is associated with a periodicity if users are determined by the online system 100 to become interested in certain items of the category at a certain periodic rate. In an embodiment, the online system 110 receives a value of periodicity of a category from a user, for example, a domain expert. In other embodiments, the online system 110 monitors a plurality of users to determine periodicity associated with categories based on historical actions of users having dynamic components associated with the category. In an embodiment, the user profile augmentation module 112 leaves the dynamic component as inactive after the expiry date of the dynamic component if the dynamic component is associated with a category having a periodicity. However, if the dynamic component is associated with a category that does not have a periodicity, the online system 110 deletes the dynamic component after the expiry date so as to make the user profile store 114 storage efficient. In an embodiment, the user profile augmentation module 112 deletes the dynamic component after the expiry date of the dynamic component if the dynamic component is associated with a category having a periodicity that indicates that the time window after which the dynamic component is likely to be needed again (after being deleted) is more than a threshold value.

In an embodiment, the user profile augmentation module 112 extends the size of the time window indicating the temporal relevance of the dynamic component based on the user interactions observed by the user profile augmentation module 112. The user profile augmentation module 112 thereby extends the expiry date of the dynamic component. Accordingly, if the online system 110 receives active user interactions associated with a category, for example, searches, interactions with content items, the user profile augmentation module 112 determines that the user is likely to have more interest in content items associated with the category than previously estimated by the user profile augmentation module 112 and accordingly extends the deadline. However, if the online system receives less than a threshold amount of active user interactions (for example, zero user interactions) associated with the category, the user profile augmentation module 112 either leaves the expiry date of the dynamic component unmodified or decreases the size of the time window, thereby moving the expiry date to an earlier time.

FIG. 5B illustrates a process for further populating data fields in the dynamic component 405 of the user profile 500, according to one embodiment. As shown in FIG. 5B, the dynamic component 405 of the user profile 500 first includes data fields for item A category 510 (as shown in FIG. 5A) and subsequently populates an additional data field describing item B category 515, suggesting that the user has loaded an additional web page that generated a tracking request 111 processed by the user profile augmentation module 112 to determine item B category 515. In this example, item B category 515 may describe an "automobile" category that includes attributes such as year, make, model, mileage, color, and the like. In addition, item B category 515 may include a temporal relevance score indicating a time window in which the user is most likely to perform an action associated with item B category 510. For example, the temporal relevance score may comprise a numeric value (e.g., from 1 to 10) indicating when the user is likely to purchase an automobile, continue shopping for automobiles of the same year, make, model, mileage, or any other characteristic described by the attributes associated with item B category 515. The temporal relevance for item B category 515 is represented in FIG. 5B by the solid border encompassing item B category 515, indicating that the temporal relevance score for item B category 515 is within a given threshold value.

FIG. 5C illustrates a process for maintaining the dynamic component 405 of the user profile 500, according to one embodiment. In the embodiment illustrated in FIG. 5C, the dynamic component 405 of the user profile 500 first includes two data fields: item A category 510 and item B category 515. However, as the user continues to visit web pages that generate tracking requests 111, additional data entries are created. In this example, item C category 520 may suggest that the user has loaded a web page describing a service such as a "public transit pass" with associated attributes describing a price, duration, terms and conditions, method of travel, etc. The temporal relevance score for item C category 520 may also be a numeric value representing the likelihood of the user purchasing a public transit pass. This temporal relevance score is represented in FIG. 5C by the solid border encompassing item C category 520. Given that the user has most recently shown interest in purchasing a public transit pass (subsequent to showing interest in shopping for automobiles as described by item B category 515), the temporal relevance score associated with item C category 520 may be higher than that of item B category 515, and may resultantly diminish the temporal relevance score of item B category 515. However, although item B category 515 may receive a low temporal relevance score, the data entry representing item B category 515 is not removed from the dynamic component 405 of the user profile 500. Rather, the data entry remains in order to provide the online system 110 with further insight regarding user interest at a later time. The decreased temporal relevance score for item B category 515 is denoted in FIG. 5C by the dotted line encompassing item B category 515, indicating that the temporal relevance score has decreased and is no longer within a given threshold value.

Process for Directing Content Items Based on Predicted Attribute Values

Figure 6:
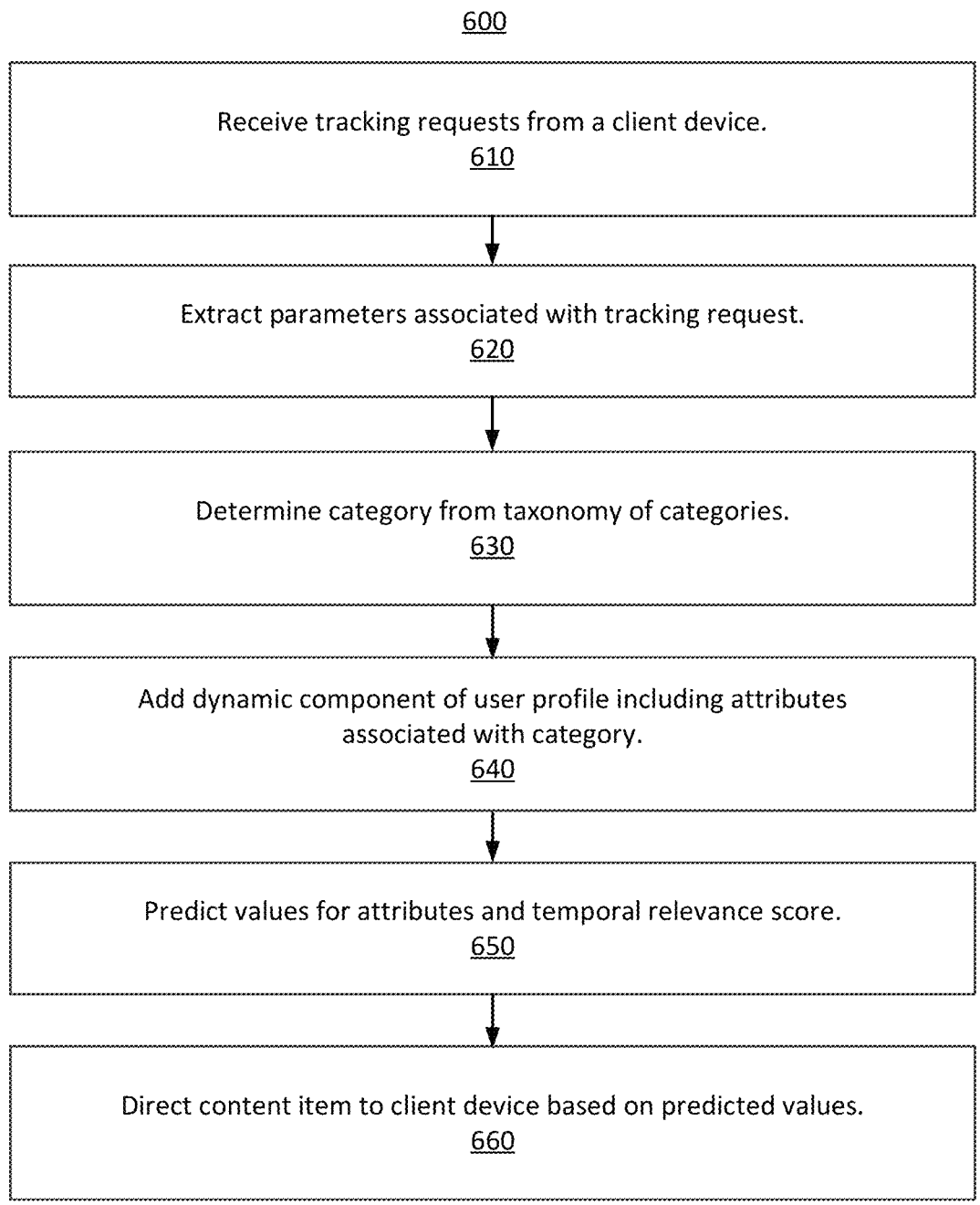
FIG. 6 illustrates a flowchart of the process for collecting and storing attributes, in accordance with an embodiment.

FIG. 6 illustrates a process for directing content items to an online system 110 user based on predicted attribute values, according to one embodiment. In the embodiment illustrated in FIG. 6, the user profile augmentation module 112 receives 610 tracking requests 111 from a client device 120 in response to the client device 120 loading a web page presenting an item for display to the user. The user profile augmentation module 112 extracts 620 parameters associated with the tracking request 111, such as a URL associated with the web page that generated the tracking request 111, data tokens contained with the URL, and/or keywords contained within HTML comprising the web page. Using the extracted parameters, the user profile augmentation module 112 determines 630 a category from the taxonomy store 230 and adds 640 a dynamic component 405 to the user profile 500 of the user that includes attributes associated with the determined category. The user profile augmentation module 112 uses one or more machine learning based models to predict 650 values for the attributes describing the determined category, as well as a temporal relevance score indicating a timeframe in which the user is most likely to find the category, or item described by the category of interest. These machine learning based models are configured to receive parameters extracted from tracking requests, and to use the parameters to predict attributes describing a category associated with the parameters. For example, if the parameters extracted from a given tracking request describe a dog-walking service, a machine learning based model retrieves attributes describing the service based on its previous training using data describing similar services (e.g., cost of service, hours of operation, and the like). In addition, the user profile augmentation module 112 can use the machine learning based models to determine a temporal relevance score associated with the category, or item described by the category. Returning to the previous example, the machine learning based models may identify that the user has not used a dog-walking service in several years (e.g., indicating that the user may be pet-sitting) and assign a lower temporal relevance score than those assigned to services that the user commissions more frequently. If the temporal relevance score is within a threshold value, the user online system 110 directs 660 a content item associated with the item described by the category to the user's client device 120 based on the predicted attribute values.

Alternative Embodiments

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer-implemented method comprising:
   receiving, by an online system, a plurality of tracking requests from one or more client devices, each tracking request generated responsive to a client device of the one or more client devices presenting a user interface received by the client device from a third party website;
   extracting one or more parameters comprising at least a parameter associated with a tracking request from the plurality of tracking requests;

determining, based on each of the one or more parameters, a category from a taxonomy of categories, the category describing an item presented on the user interface;

adding, based on the determined category, a dynamic component of a user profile, wherein the user profile dynamic component includes one or more attributes describing the determined category;

predicting, based on one or more machine learning based models configured to receive the one or more parameters:

values for the one or more attributes describing the determined category, and a temporal relevance score for the dynamic component, the temporal relevance score indicating a period of time in which a user is likely to perform an action associated with an item of the determined category; and directing a content item to a client device associated with the user profile, wherein the directing is based on the predicted values of the one or more attributes of the user profile dynamic component and the temporal relevance score.

2. The computer-implemented method of claim 1, wherein the one or more parameters comprise another parameter extracted from data obtained through web crawling microdata contained within the user interface.

3. The computer-implemented method of claim 2, further comprising:

web crawling the microdata contained within the user interface by:

extracting, from a web page from the third party website, a plurality of keywords describing the item presented on the user interface; and cross-referencing the plurality of keywords against a plurality of stored keywords to determine the category.

4. The computer-implemented method of claim 1, wherein the one or more parameters are extracted from a uniform resource locator (URL) of the user interface, the URL including tokens describing the one or more attributes associated with the category.

5. The computer-implemented method of claim 1, wherein the one or more attributes associated with each category include one or more of: an item color, an item size, and/or an item ID.

6. The computer-implemented method of claim 1, wherein the taxonomy of categories is associated with a list of items, wherein each item is mapped to one or more categories.

7. The computer-implemented method of claim 1, wherein the tracking request is received from the client device of the one or more client devices responsive to the client device rendering the web page for display, wherein the rendering of the web page causes execution of instructions for sending a tracking request to the online system.

8. The computer-implemented method of claim 1, further comprising:

adding the temporal relevance score to the dynamic component of the user profile, wherein the temporal relevance score is associated with the determined category;

determining, based on the period of time and a time at which the dynamic component was added, an expiry date for the dynamic component of the user profile; and deleting the dynamic component after the expiry date.

9. The computer-implemented method of claim 8, further comprising:

monitoring user interactions associated with the determined category; and modifying the expiry date of the dynamic component according to the monitored user interactions associated with the determined category.

10. The computer-implemented method of claim 8, further comprising:

storing information indicating whether a category of the dynamic component has a periodicity; and determining whether to delete the dynamic component after the expiry date based on whether the category of the dynamic component has a periodicity.

11. The computer-implemented method of claim 10, further comprising:

responsive to determining that the dynamic component is not likely to be needed after more than a threshold time period, deleting the dynamic component after the expiry date in spite of the category of the dynamic component being associated with a periodicity.

12. The computer-implemented method of claim 10, further comprising:

determining the periodicity of the category of the dynamic component based on historic actions of other users having dynamic components of the category.

13. The computer-implemented method of claim 12, further comprising:

responsive to determining that the dynamic component does not have peridocity, deleting the dynamic component after the expiry date.

14. The computer-implemented method of claim 12, further comprising:

responsive to determining that the dynamic component has periodicity, marking the dynamic component after the expiry date as inactive without deleting the dynamic component.

15. The computer-implemented method of claim 1, wherein the temporal relevance score comprises a weighted average indicative of a frequency with which a user interacts with the determined category.

16. The computer-implemented method of claim 15, further comprising:

determining a frequency of interactions with the determined category;

responsive to determining that the frequency of interactions is above a threshold frequency, increasing the temporal relevance score; and responsive to determining that the frequency of interactions is below the threshold frequency, decreasing the temporal relevance score.

17. The computer-implemented method of claim 1, wherein determining, based on each of the one or more parameters, the category from the taxonomy of categories comprises:

inputting the one or more parameters into the one or more machine learning models; and receiving, as output from the one or more machine learning models, the determined category from the taxonomy of categories.

18. The method of claim 1, further comprising:

building a taxonomy store by:

creating a test account, wherein the test account communicates with the third party website;

generating a Hypertext Transfer Protocol (HTTP) request for performing a search request for the item;

receiving, responsive to the HTTP request, a first web page from the third party website, wherein the first web page comprises a plurality of items fulfilling the search request;

extracting, from the first web page, a first plurality of keywords describing each item of the plurality of items;

for each respective item of the plurality of items:
  generating an additional HTTP request for information for the respective item,
  receiving, responsive to the additional HTTP request, a second web page from the third party website, and
  extracting, from the second web page, a second plurality of keywords describing information for the respective item; and
  adding the first plurality of keywords and second plurality of keywords to the taxonomy store, wherein the first plurality of keywords and second plurality of keywords are associated with the category from the taxonomy of categories.

19. A non-transitory computer readable storage medium, storing instructions for the steps comprising:

receiving, by an online system, a plurality of tracking requests from one or more client devices, each tracking request generated responsive to a client device of the one or more client devices presenting a user interface received by the client device from a third party website;

extracting one or more parameters comprising at least a parameter associated with a tracking request from the plurality of tracking requests;

determining, based on each of the one or more parameters, a category from a taxonomy of categories, the category describing an item presented on the user interface;

adding, based on the determined category, a dynamic component of a user profile, wherein the user profile dynamic component includes one or more attributes describing the determined category;

predicting, based on one or more machine learning based models configured to receive the one or more parameters:
  values for the one or more attributes describing the determined category; and
  a temporal relevance score for the dynamic component, the temporal relevance score indicating a period of time in which a user is likely to perform an action associated with an item of the determined category; and directing a content item to a client device associated with the user profile, wherein the directing is based on the predicted values of the one or more attributes of the user profile dynamic component and the temporal relevance score.

20. A computer system comprising:

one or more electronic processors; and a non-transitory computer readable storage medium, storing instructions for the steps comprising:

receiving, by an online system, a plurality of tracking requests from one or more client devices, each tracking request generated responsive to a client device of the one or more client devices presenting a user interface received by the client device from a third party website;

extracting one or more parameters comprising at least a parameter associated with a tracking request from the plurality of tracking requests;

determining, based on each of the one or more parameters, a category from a taxonomy of categories, the category describing an item presented on the user interface;

adding, based on the determined category, a dynamic component of a user profile, wherein the user profile dynamic component includes one or more attributes describing the determined category;

predicting, based on one or more machine learning based models configured to receive the one or more parameters:
  values for the one or more attributes describing the determined category; and
  a temporal relevance score for the dynamic component, the temporal relevance score indicating a period of time in which a user is likely to perform an action associated with an item of the determined category; and directing a content item to a client device associated with the user profile, wherein the directing is based on the predicted values of the one or more attributes of the user profile dynamic component and the temporal relevance score.

* * * * *